INVENTOR.
LAURENCE B. CARROLL, JR.
BY
*Darley & Darley*
ATTORNEYS

United States Patent Office 3,106,782
Patented Oct. 15, 1963

3,106,782
CONTOUR CHECKING ASSEMBLY
Laurence B. Carroll, Jr., Hagerstown, Md., assignor to Fairchild Stratos Corporation, a corporation of Maryland
Filed Sept. 1, 1961, Ser. No. 135,552
4 Claims. (Cl. 33—174)

This invention relates to an optical contour checking system for the purpose of controlling the accuracy of a surface of revolution as, for example, a large parabolic or hyperbolic reflector antenna for radar. With the advent of very large radar reflecting antennas, the problem of inspecting and controlling the accuracy of the contour, both during and after manufacture as well as during erection and use in the field, has become a problem of major importance. Any inspection means used must be extremely accurate and, preferably, simple in operation, light in weight, demountable, inexpensive, and mobile.

The present invention consists, basically, of a standard theodolite set on the central axis of the reflector for measuring horizontal and vertical angles and a plurality of fixed length rods or links having sighting targets on one of their ends which may be joined together end to end to form a chain and fed radially outward along the inner surface of the antenna dish. In the preferred embodiment the targets are in the form of fixed diameter rollers which serve a dual purpose of a target (by sighting on the upper edge) and a spacer to space the target a fixed, known distance from the surface on which they rest and on which they may roll.

In order to be able to check the reflector surface in any of a plurality of adjusted positions between horizontal and vertical, the targets may be held in position against the surface on which they roll by spring pressed rollers which, passing through radial slots between adjacent surface sheets, engage and roll on the upper and lower surfaces of the reflector plates. The chains of linked together rods are attached to fittings on the central structure of the antenna which are located radially about the axis a fixed distance therefrom in order to position all the chains radially about the theodolite in proper position. Although the drawings indicate the use of an inner, end link for joining the chain to the positioning fitting, which link is of a different length than all the other links, it is understood that the links of the chain may all be of the same length depending entirely upon the design of the particular surface contour in connection with which the invention is being used. It is conceivable that cases may arise in which all the links would be of different lengths. Predetermined angular settings are made on the theodolite which correspond to the outward positions of the roller targets. The targets can then be swept circumferentially by the theodolite to determine whether or not they all lie at the proper position. The targets, which are not securely locked to a given point on the antenna proper, continue to lie in radial plane positions relatively unaffected by thermal changes. However, calculations can be made to predict the locations of the targets under various environmental conditions and a measurement of deviations due to deflections and/or other variables can be compared with allowable tolerances.

Since the primary object of the invention is to provide a means for controlling the accuracy of a manufactured surface of revolution, the accuracy is dependent on a mathematical approach which considers all the tolerance factors. With these tolerances controlled, the basic mathematical problem is to locate the position of the center of a circle, which circle is moved on a large arc about a predetermined point and which circle becomes tangent to the shape of revolution. Thereafter, with additional tolerance factors controlled, a computation of angles of sight relative to a plane perpendicular to the axis of revolution is made.

When all the measuring rods are joined end to end and all the chains of linked together rods are in position they resemble the spokes of a wheel radiating from the hub.

Although the invention has been shown in its preferred form it is to be understood that it is subject to modifications. For example, though I have found it preferable that the rods be of very accurately controlled, fixed length, these rods may be constructed in such fashion that they can be adjusted to a plurality of lengths whereby the total number of rods needed may be substantially reduced. The adjustable type rod may take any of several well known forms. As an example, it may comprise a plurality of separate segments, of different diameters, telescoping together. Aligned, predrilled, matching holes may be provided through the walls of the segments at the desired locations and the adjusted sections may be locked in the desired positions by tapered pins. The adjusting means may, of course, include other means well known in the art.

The many detailed objects of this invention will be explained in connection with the embodiment thereof selected for illustration in the accompanying drawings.

While the subject matter of this invention is not specifically limited to the checking and adjustment of the contour of a figure of revolution such as a radar antenna, the description is with respect to such an antenna but only in an illustrative sense.

As is well understood in the electrical communication art, radar antennas which are often built of large size generally include a microwave reflecting surface of suitable contour which has a large central opening. This opening is on the axis of the reflector and is usually of circular cross-section defined by the adjacent edges of the inner plates or panels of the reflecting surface. Furthermore, in accordance with such practice there is mounted in this opening on the axis of the reflecting surface a feed horn ring which is mounted with respect to the reflecting surface so that the face of the ring lies substantially in the plane of the periphery of the opening in which it is mounted.

Figure 1:
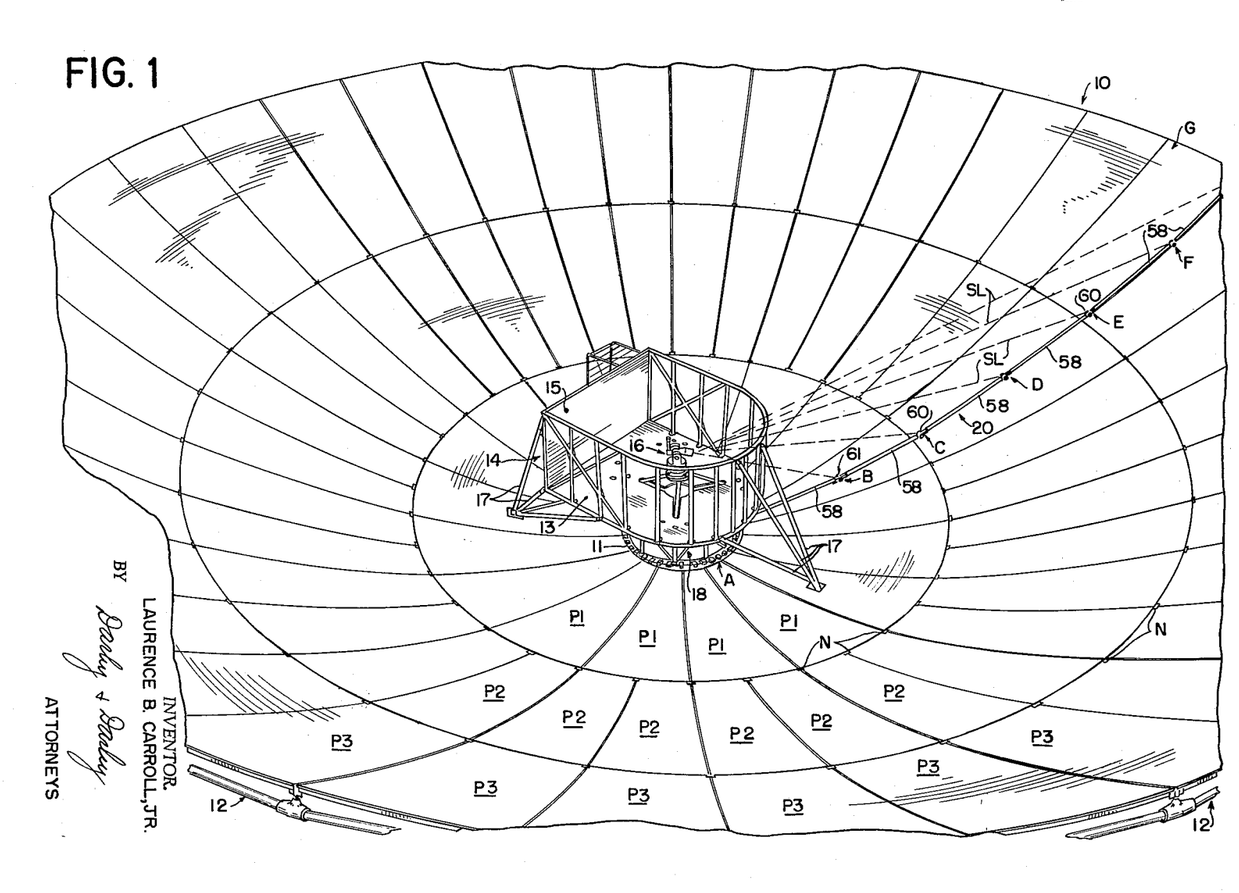
FIGURE 1 is a perspective view with some parts broken away to permit illustration on an enlarged scale of the invention as applied to a radar antenna.
Figure 5:
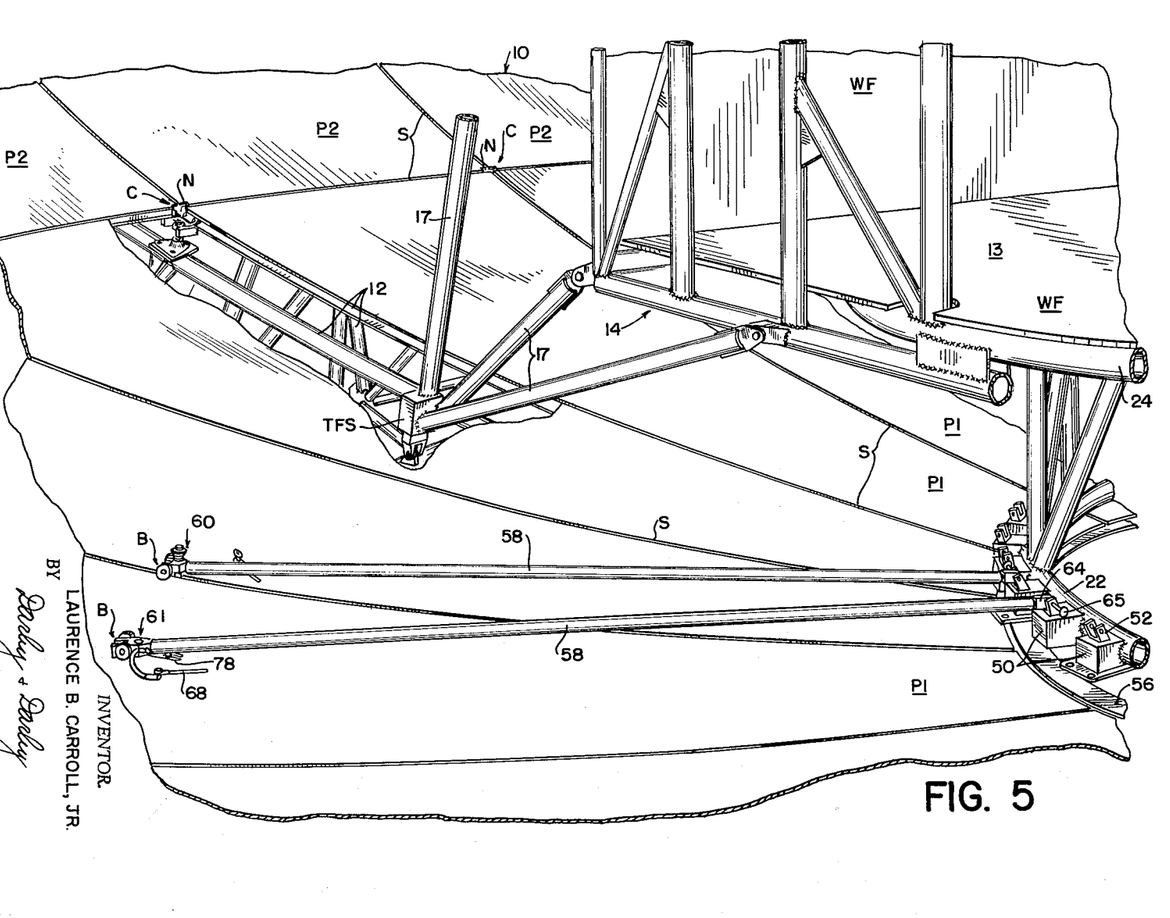
FIGURE 5 is an enlarged perspective view of a section of the assembly of FIG. 1 further illustrating the construction and relationship of the parts and in part of the manner of use thereof.

Referring to FIG. 1 a reflective radar antenna is indicated generally by the reference character 10. It consists of a plurality of shaped panels or plates of suitable metal which are supported by and attached to a complex supporting framework, a portion of which is indicated at 12. The central circular opening in the surface formed by the plates appears at 11. The reflective surface in the case illustrated is built up of a series of segmental plates arranged in a circular pattern so as to form the opening 11. The inner series of plates is shown at P1, surrounding the inner series of plates in a circular pattern and contiguous to their outer periphery is a second series of segmental plates P2 and they in turn are similarly surrounded in the case illustrated on an outer set P3. The plates of each set with respect to each other and with respect to the plates of the other set lie closely contiguous to each other but are separated by a series of radially extending slots S which are best seen in FIG. 5.

Figure 6:
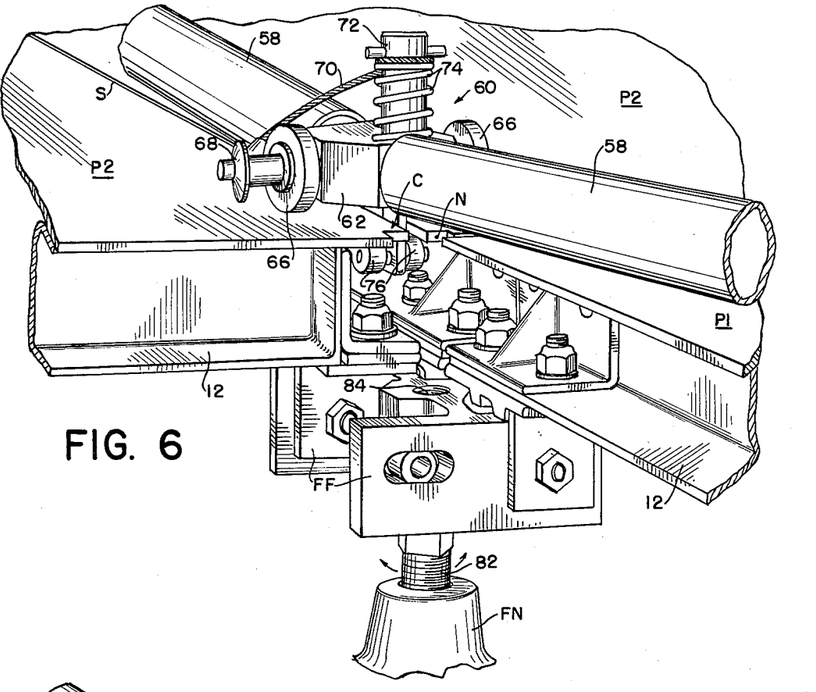
FIGURE 6 is an enlarged perspective view of the structure used for adjusting the position of the adjacent corners of the panels or plates of the antenna and illustrating how the measuring rod chains are positioned.

These plates are all attached to the supporting framework 12 by suitable fixtures exemplified by the construction illustrated in FIG. 6, for example, and form part of the antenna assembly. It is understood, of course, that these assemblies are widely used in various specifically different structural forms and specifically form no part of this invention. The invention is primarily concerned with the adjustment of the plates or panels on the framework 12, and in relation to each other, so that extremely accurate reflective surface contour is obtained after installation of the structure.

There is generally illustrated at 14, a work cage which forms a part of a temporary installation put in place during the adjustment of the antenna contour, which work cage is ultimately removed after the adjustments are completed. This work cage includes, as shown, an enclosing workman protective wall of any suitable material and construction for the work area. The work area consists of a platform 13 used when the central axis of the antenna is vertical and another platform 15 used when the antenna is tipped up so that the axis is horizontal. As shown the work cage includes strut assemblies 17 of suitable construction by means of which the cage can be temporarily supported from the antenna framework. One of these strut assemblies 17 for the work cage 14 is shown in some detail in FIG. 5, and there is indicated at TFS a fixture for supporting it on the framework 12 of the antenna.

Figure 2:
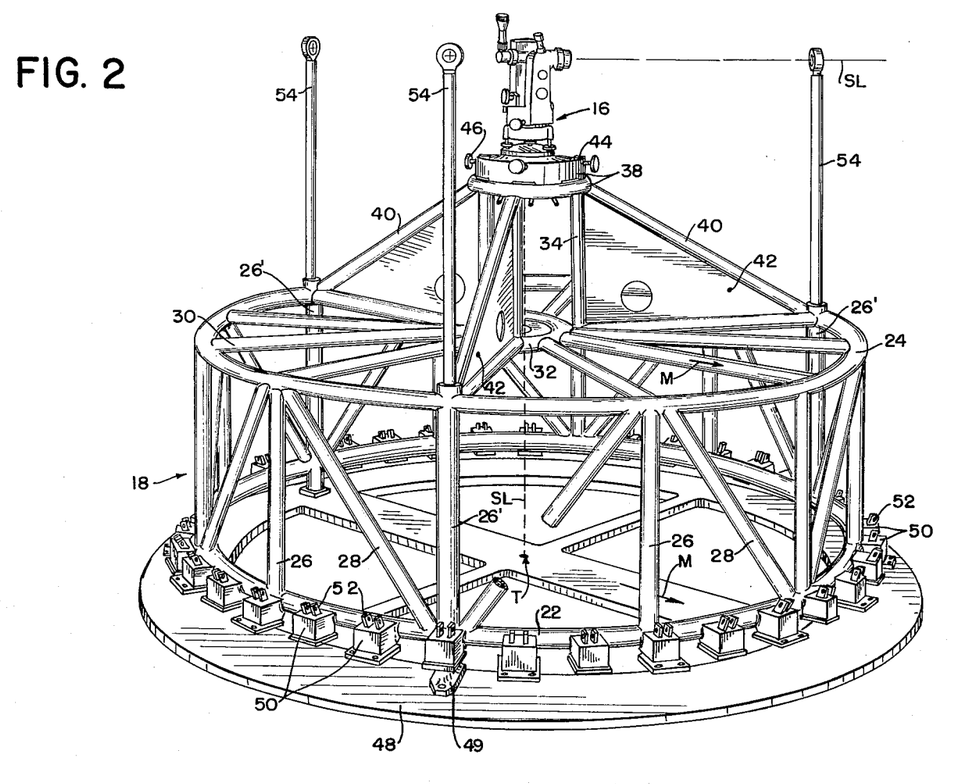
FIGURE 2 is a perspective view of the theodolite mount forming part of the assembly of FIG. 1.

Positioned under the work cage 14 is a theodolite mount assembly 18, shown in considerable detail in FIG. 2, serving to position and support a suitable standard theodolite 16 more or less at the center of the work area formed by the cage 14.

Referring to FIG. 2, the theodolite mount in the form illustrated consists of a supporting framework of tubular members which include a pair of parallel vertically spaced rings 22 and 24. These rings are connected by rigid vertical and inclined bracing members 26 and 28. At the center and in the plane of the ring 24 is a similar ring 32, which rings are rigidly connected together by a series of radial braces 30. Supported in a plane above and parallel to the ring 32 is a ring 38 held in place by inclined braces 40 and reinforced by the triangular plates 42. All of these members are preferably of metal and are welded together at the points of connection to form a very strong, rigid framework termed the theodolite mount.

Some of the vertical braces, three in the case illustrated, which interconnect the rings 22 and 24, viz., the strips 26, are of tubular form and open at the ends so that the station plane rods 54 can be mounted thereon so as to rest on a matchplate 48. First it is noted, however, that the theodolite 16, a commercial example of which is a Watts microscopic theodolite, is mounted in the ring 38 and can be locked therein in any desired adjusted position horizontally by a series of thumb screws 46.

It is noted that the matchplate is really a fixture used for initially aligning the theodolite with respect to the theodolite mount. The matchplate 48 also serves as a master tool for locating the adjustment holes for the mount in the feed horn ring. This ring is of machine metal and is provided with a centered optical target T and a general position indicating mark M for the mount 18, which is also provided with a similar mark M on one of the struts 30. These marks are related to the antenna assembly so that they will be in an up position when the antenna is in the so called "up antenna" position, that is with its axis horizontal. This insures the correct rotational positioning of the mount with respect to the antenna during adjustments.

At this point it might be helpful to note that the theodolite includes a vertical optical plummet which is used to exactly center the theodolite 16 over the target T on the matchplate. Foreshadowing the purpose of this adjustment this insures that the theodolite will be exactly on the axis of the antenna when the mount is properly positioned on the feed horn ring, as will be explained later. In effecting the necessary shifting of the entire theodolite in a horizontal plane to effect the coincidence of the line of sight S1 of the optical plummet on the target T, the adjusting screws 46 are used. They also serve to lock the theodolite in adjusted position on the mounting ring 38.

Figures 3, 4A:
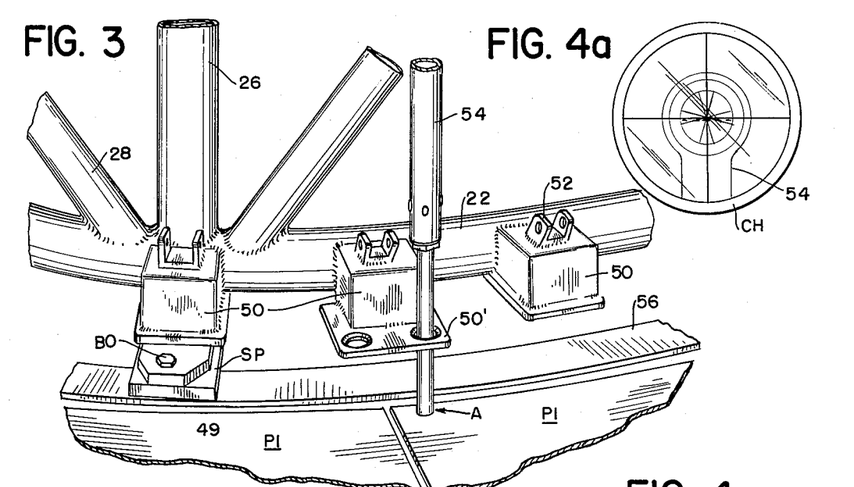
FIGURE 3 is an enlarged detailed view of a portion of the structure of the theodolite mount serving also to illustrate some of the steps in the procedure for using the invention.
FIGURE 4a is a diagrammatic illustration of the relationship of the cross hairs of the theoodlite telescope and of one of the optical targets further illustrating the use of those parts which also appear in FIG. 4.
Figure 4:
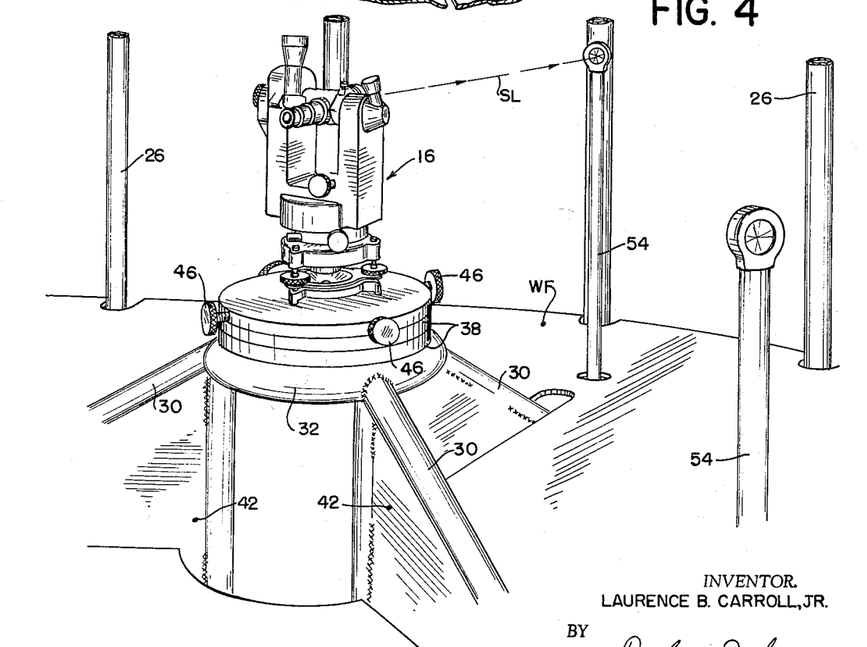
FIGURE 4 is a perspective view of another part of the theodolite mount further illustrating the procedure used.

At this point it should also be noted that the further adjustment of the theodolite while its mount is supported on the matchplate 48 is effected by the use of the station plane rods 54. These rods are provided with targets at the upper end each having cross hairs which are positioned at an exact predetermined distance from the lower ends of the rods, one of which is illustrated in FIG. 3. It is expedient to note at this point that secured around the ring 22, at suitably spaced positions, are a series of mounting blocks 50 provided with plates 50' having holes therethrough, as clearly shown in FIG. 3. Provided at the top of each block 50 is a bifurcated bracket 52 which will be referred to later. As shown in FIGS. 2 and 3, the theodolite mount has mounting feet 49 at suitable points around its circumference by means of which it is supported on the matchplate 48.

In addition to positioning the optical plummet of the theodolite at the center of the matchplate, it is necessary to level it, and this is done by using its built-in base level and adjusting the screws 16 usually provided for this purpose. The elevation vernier which also forms a part of an instrument of this type is then set relative to the vertical axis of the theodolite by bringing the split bubble also forming part of the instrument and mounted on the side thereof, not shown, into coincidence, all as is usual in setting up an instrument of this type.

The station plane rods 54 are then mounted in the tubular struts 26' so that their lower ends rest on the matchplate 48 in a manner similar to their resting on the antenna panels P1, as indicated in FIG. 3, when the mount is later supported on the feed horn ring. In other words the lower ends of the station plane rods 54 pass down through the struts 26' emerging at the bottom thereof and rest on the ring 48. This places the cross hairs, see FIG. 2, of the targets of these rods at a fixed known distance from the top surface of the ring 48. The theodolite is then brought into a plane parallel to the matchplate 48 by sighting through the telescope on the theodolite so as to bring its cross hairs into coincidence with the cross hairs CH of the station plane rods 54, diagrammatically illustrated in FIG. 4a. This adjustment is made for each of the positions corresponding to the station plane rods 54, in this case three, see FIG. 2.

Upon the completion of all of these adjustments, that is with respect to the station plane rods and the target T, the theodolite is positively aligned in a plane parallel to the plane of the matchplate and on a perpendicular plane through the matchplate center target T.

When the theodolite is thus accurately positioned care must be taken to see that its adjusted position is not disturbed throughout its subsequent use about to be explained.

It is noted, as will be understood by those skilled in the art, that the feed horn assembly includes a ring and a bulkhead, that is a plate (not shown) of known thickness which covers the surface of the ring. Therefore, in order to allow for its presence in the final assembly, the spacing plates SP, see FIG. 3, are positioned between the feet 49 of the theodolite mount and the feed ring 56. When this mount is placed on the feed horn ring 56, see FIG. 3, spacing plates SP of the same thickness as the feed horn bulkhead are placed under the feet 49 during the adjustment to be described.

The theodolite mount 18 with the exactly positioned theodolite 16 secured thereon is now removed from the matchplate 48 and installed on the feed horn ring of the antenna. At this point it may be noted that during the initial erection of the antenna an exact center corresponding to the target T in FIG. 2 is provided around which the antenna structure is assembled. This target is usually provided in the concrete mounting bed for the antenna structure. The theodolite mount is now positioned on the feed horn ring 56, see FIGS. 3 and 5, so that the "up antenna" mark M on the mount is properly aligned with a suitable reference mark. This is usually accomplished because the feed horn ring is provided with a series of holes for the mounting of the feet 49 which are accurately duplicated in the matchplate 48, see FIG. 2.

These holes also serve for the placement of the hold bolts for the feed horn bulkhead when it is later mounted on the feed horn ring. The proper positioning of the mount on the feed horn ring 56 will place the optical plummet for the theodolite directly over the field target which is the axis of the antenna. In other words, the vertical axis of the theodolite is exactly positioned on the axis of the antenna by the act of attaching the mount 18 in the properly positioned holes of the feed horn ring, one of which would be that through which the bolt BO, see FIG. 3, passes. The work cage 14 is now attached to the antenna framework in the manner previously described and as illustrated for one of the strut assemblies 17 in FIG. 5.

Although it is incidental, it is noted that the floor 13 of the work cage is sectionalized and hingedly mounted so that the floor can be routed out of the way at the time the work cage is positioned over the mount 18 so as not to interfere with the theodolite and the struts 40 of the mount 18 which pass up through an opening in the floor, see FIG. 1. The result of all of these operations is that the theodolite is now properly adjusted and positioned on the feed horn ring for the desired adjustments of the panels of the reflector. In order to effect these adjustments the following structure is used.

Figure 7:
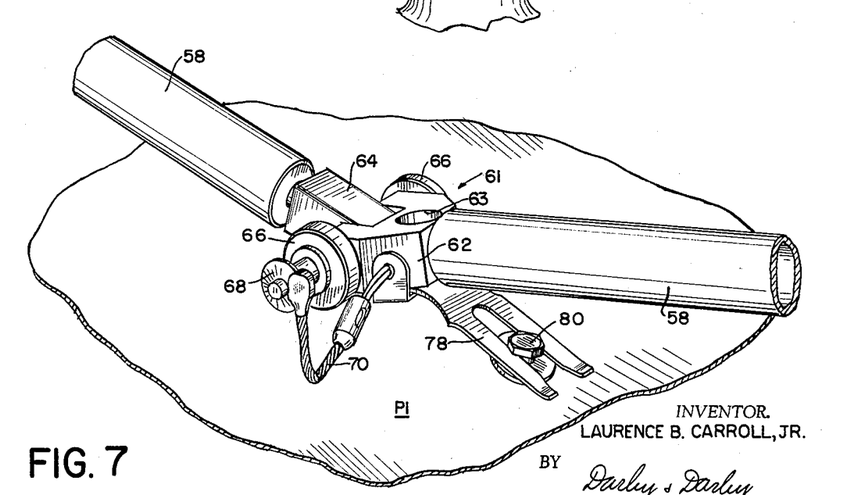
FIGURE 7 is an enlarged perspective view of the assembly detail.

A series of rod chains are provided. These chains are made up of a plurality of connected links 58. These links comprise rods of known length having connecting fixtures at each end. For example, as shown in FIG. 5, one end of each rod is provided with a fixture 64, shown also in FIG. 7, which fits into the bifurcated brackets 52. The fixture 64 is provided with a hole by means of which it is secured to the bracket 52 by means of the pin 65. The other end of each rod 58 is provided with a fixture generally indicated at 60 and 61, see FIG. 5. The reason for the use of two reference characters, that is 60 and 61, is that there is a slight difference in construction between the two fixtures which are otherwise basically the same. Thus, as shown in FIG. 7, this fixture comprises a bifurcated plate 62 on which are rotatably mounted a pair of rollers 66 of known diameter. The plate 62 is properly dimensioned to receive the fixture 64 of an adjusting rod 58, as illustrated in FIG. 7, and the two can be connected together to form a hinge connection by means of a pin 68 which is secured to the plate 62 by means of a flexible cable 70 so that the pins will not become loose.

It is noted that the distance between the center of the holes in the fixture 64 through which the pins 65 pass and the center of the holes in the plate 62 through which the pins 68 pass are of an exact known length. As shown in FIG. 7 the plate 62 is provided with a vertical hole 63 in which a pin 72, see FIG. 6, can slide vertically. A compression spring 74 surrounds it and serves to normally hold it in a raised position. On the lower end of the pin 72 are a pair of small rollers 76. The lower end of the pin is cut down to a thin blade that can pass along the slots S between the panels. The rollers 76 are dimensioned so that they can pass through the notches N where the various panels come together, so that these rollers may engage the under surfaces of the panels, as is clearly illustrated in FIG. 6. Thus, by connecting a number of the rods 58 together in end to end relation, as illustrated in FIG. 7, and by depressing the pins 72 and inserting the roller 76 through the notches N, the rod chains can be fed out from the center of the antenna along the slots S to the outer periphery of the antenna, as illustrated in FIG. 1.

In the application illustrated the rods 58 are roughly of one-half the length of each of the panels so that it takes two rods per panel. This brings the connecting fixtures between the rods and particularly the rollers 66 roughly at the midpoint and at the ends of the panels, that is at the points B, C, D, E, F and G of FIG. 1. The springs 74 force the rollers 66 into firm contact with the upper surfaces of the panels and the rollers 75 with the under surfaces.

It is also noted, as illustrated in FIG. 1, that with regard to the points B, because there is no slot in the middle of the panels P1, another arrangement is used to hold the roller 66 in firm contact with the upper surfaces of the plates P1. This is accomplished by means of a spring finger 78, see FIG. 7, secured to the under surface of the plate 62 of the innermost rods 58. All this comes about by the fact, as is shown in FIG. 1, that the circumferential width of the plates P2 at their narrow ends is one-half the circumferential width of the plates P1 at their outer ends. Thus the slots between the plates P2 do not extend to the central opening 11 through the plates P1. For this reason the plates P1 are provided with holes through which the bolts 80, FIG. 7, can pass to hold the spring clips 78 down and thereby bring the roller 66 into firm contact with the upper surfaces of the plate P1. Spring fingers 78 can be firmly attached to the plates 62 or be detachably secured thereto, so that they can be applied to any one of the rods 58, thereby making them of uniform construction.

It might be noted in passing that because of this slight difference the assemblies at the outer ends of the rods 58 as illustrated in FIG. 5, one assembly has been given the reference character 60 and the other 61. The addition of the spring finger 78 is the only difference between the assembly 61 and the assembly 60.

Referring to FIGS. 6 and 7, it will be noted that the framework 12 where the corners of adjacent plates come together, that is at the notches N, there is provided an adjusting arrangement for raising and lowering the plates with respect to the frame 12. This arrangement includes a fixture FN, secured to the main framework 12, having a threaded aperture which receives a threaded rod 82. This threaded rod is provided with righthand and lefthand threads at opposite ends with a central nut 81. The upper threaded end of the rod fits in a threaded opening 84 in a fixture FF bolted to and forming part of the main framework 12 for the antenna.

As will be obvious from these figures, when the double ended threaded rod 82 is rotated, as for example by means of a screwdriver SD, fixture FF can be raised or lowered with respect to fixture FN. Likewise, a wrench applied to the nut 81 will do the same thing. Thus, the level of the corners of the plates P1 and P2 which come together at this particular point, can be raised or lowered by rotating the threaded rod 82 which acts like a mechanical chuck.

Starting out with the assumption that the theodolite mount has been secured to the feed horn ring, as illustrated in FIGS. 1, 3 and 5, under properly oriented position as previously described, and that the work cage 14 has been mounted in proper position, the apparatus described above in detail functions as follows. The operator mounts one end of a rod 58 in the bracket 52 of the block 50 at the zero or starting position in a circumferential sense. In the system illustrated this can be termed a zero degree position, and as will appear later, succeeding positions in ten degree increments from the starting point provide radial lines of checking and adjustment. It may be noted that for the first checking and adjustment the antenna framework and hence the antenna, are horizontally disposed so that the axis of the antenna is vertical. This relation of the parts is shown in FIG. 1. The attachment of the measuring rod 58 to the fixture 50–52 at the zero position requires that the fixture 61 at its outer end be attached a the approximate center of the related panel P1 by means of the spring finger 78, as previously described.

For dicussion it can be further assumed that the position of the linked chain of rods 58 shown in FIG. 1 is the zero position. The operator then inserts the rollers 76 at the end of a second rod 58 through the notch and into the slit S between the two panels P2, which are arranged endwise on the panels P1. The outer end of the second rod is then pushed along the slot towards the outer periphery of the antenna and succeeding lengths of rod are attached end to end by means of the pins 68, as illustrated in FIGS. 6 and 7, until the chain of rods extends to the periphery of the antenna. The innermost end of the chain is then coupled to the fixture 61 in the same way providing the arrangement illustrated in FIG. 1, wherein the target rollers 66 at each joint are positioned at the points B, C, D, E, F and G.

Figure 8:
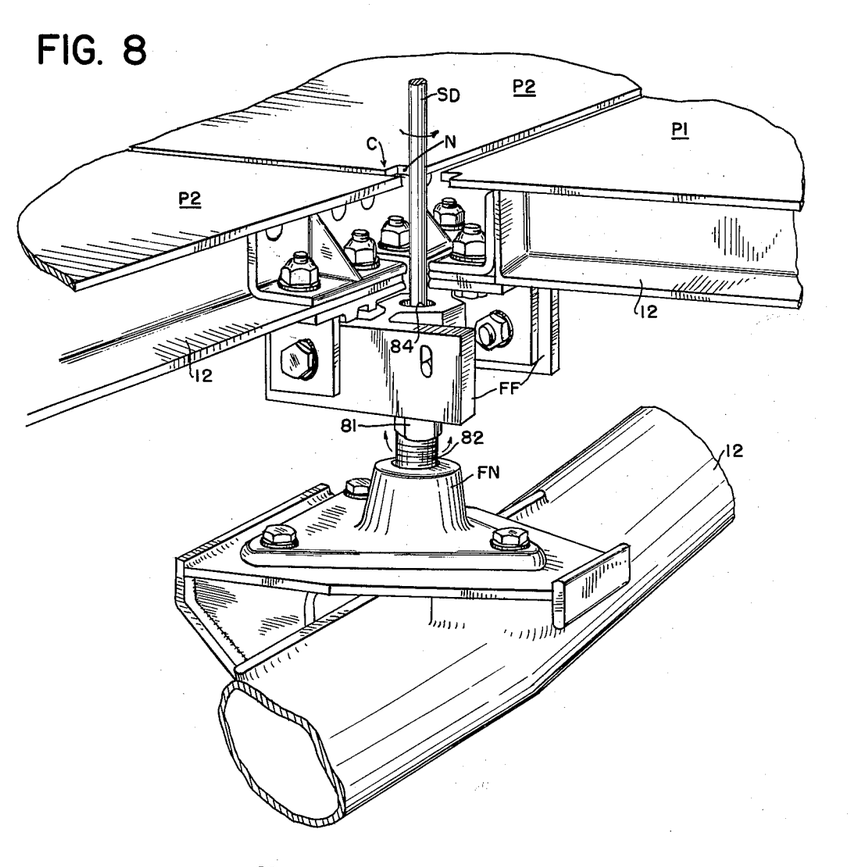
FIGURE 8 is a view similar to FIG. 6 from a different angle, illustrating a step in the adjustment of the panel contour.

The innermost end of the panel P1 under discussion is then adjusted vertically with regard to the framework to the proper position in the manner illustrated in FIG. 3. This is done by placing a station plane rod 54 into the proper hole of the plate 50′ on the related fixture 50. As is clear from FIG. 1, the floor 13 of the cage 14 overhangs the opening 11 in the antenna surface and the floor 15 is provided with properly positioned holes vertically aligned with the holes in the plate 50 so that the target ends of the station plane rods project above the floor. The operator then sights on the target of that rod through the theodolite telescope to ascertain whether the cross hairs of the target are above or below the cross hairs of the telescope. If the target cross hairs are below those of the telescope as shown by the doted lines in FIG. 4a, this means that the corner of the plate P1 at the point A is too high, and the related chuck similar to the chuck shown in FIGS. 6 and 8 is adjusted either from above or below to bring the cross hairs into coincidence. The result is that that corner of that plate is in proper position.

In determining the correct vertical angle of the telescope of the theodolite for the point A, adjustment temperature correction must be included. As will be well understood in a large structure of this type the distortions due to temperature changes must be allowed for if the surface contour of the antenna is to be brought into exact position. These corrections are provided by means of charts which have been prepared in advance so that for particular temperature conditions the correct angular position of the telescope in a vertical plane can be preset. It is also noted that since the point A is so close to the telescope a close focus lens is used, as those skilled in the art will understand. Naturally, as each corner at the point A of the inner circle of panels is adjusted to the proper position the station plane rod is progressively advanced circumferentially around the work cage so as to successively check and adjust each corner of each plate in this circle of plates. It is preferable that the inner ends of all of the plates P1 be first thus adjusted to correct position before proceeding to adjust the plates for other positions.

Returning to FIG. 1 and the rod chain at zero position as illustrated therein, the next reading is taken on the rollers 66 for the point C. For this operation the close focus lens of the theodolite is removed and the telescope of the theodolite is adjusted for the correct angle for this point, also taken from prepared charts, and of course again corrected for temperature conditions. The telescope is focussed on the roller 66 at the point C and the panel in question is adjusted vertically until the cross hairs of the telescope just touch the top of the roller 66 at the point C, as diagrammatically illustrated in FIG. 9. As illustrated in this figure it sometimes happens that the cross hairs do not touch both rollers, in which event the reading is taken by the higher roller as shown.

Figure 9:
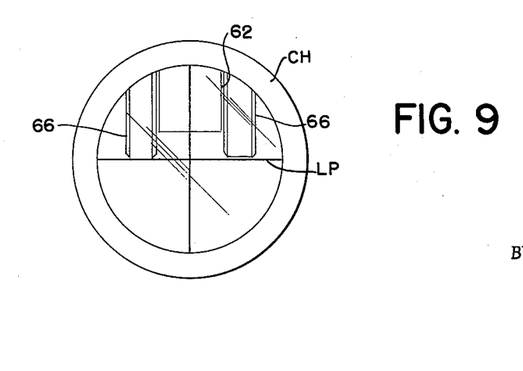
FIGURE 9 is a diagrammatic view as an aid to explaining a step in the procedure of using this invention.

It is also noted that the image is inverted in FIG. 9, as is to be explained. The jack at the point C is adjusted to bring one or both of the rollers 66 for the fixture 60 at that point into contact with the horizontal cross hair LP of the telescope, as shown in FIG. 9. It is noted in passing that no reading was taken at the point B in the center of the related plate P1 because there is no jack under the plate at these points. In the next or ten degree position of the rod link chain readings will be taken at the points B on either side of the central position as a check when the adjustments are made along that radius. For clarification it may be noted that the spring finger 78 of the fixture 61 at the central position for point B is provided merely to hold the chain down against the panel.

The adjustments just described for point C are continued outwardly for the succeeding points D, E, F and G. The rod link chain is then shifted to the next ten degree position which will put it in line with the slot to the left of the position shown in FIG. 1, assuming that measurements will be taken in a counterclockwise direction around the surface. It is of course apparent that three or four of the rod chains can be installed in succeeding circumferential positions before taking readings so that a number of adjustments could be taken successively along different radii before requiring replacement of the rod chains to succeeding positions.

It will be seen that by the apparatus herein disclosed and the procedure detailed herein, the contour of the reflective surface made up of the multiplicity of panels, can be very accurately adjusted to a predesigned surface of revolution. It may be noted in passing that in some cases adjustments from above by means of a screwdriver, as illustrated in FIG. 8, may not be effective because of the weight of the operator standing on the structure. In this event he may work from below using a wrench on the nut 81.

From the above description of one embodiment of this invention it will be immediately apparent that the details thereof and the manner of use of the apparatus can be varied without departure from the novel subject matter herein disclosed. It is obvious, therefore, that the scope of protection afforded hereby be determined by the appended claims rather than by the single example selected for illustrative purposes herein.

What is claimed is:

1. In a device for optically checking the accuracy of contour of a surface of revolution the combination of a theodolite, mounting means mounting said theodolite on the axis of said surface of revolution, a rod, a sighting target on one end of said rod, spacing means on the said one end of said rod for engagement with the said surface to thereby space said target a predetermined distance from said surface, and positioning means near said axis engaging the other end of said rod to thereby position said rod radially about said theodolite in any of a plurality of selected positions.

2. In a device for optically checking the accuracy of contour of a surface of revolution the combination of a theodolite, theodolite mounting means positioning said theodolite on the axis of said surface of revolution, a rod, a roller of predetermined diameter journaled on one end of said rod for rolling contact with said surface, and positioning means near the said axis engaging the other end of said rod and positioning said rod radially about said theodolite in any of a plurality of selected positions.

3. In a device for optically checking the accuracy of contour of a surface of revolution the combination of a theodolite, theodolite mounting means mounting said theodolite on the axis of said surface of revolution, a plurality of rigid links, a sighting target one one end of each link, connecting means for pivotally joining said links end to end and forming a chain, spacing means on the target end of each of said links for engagement with said surface to thereby space said targets a predetermined distance from said surface, and positioning means near the said axis engaging the non-target end of said chain whereby said chain may be positioned radially about said theodolite in any of a plurality of selected positions.

4. In a device for optically checking the accuracy of contour of a surface of revolution the combination of a theodolite, theodolite mounting means mounting said theodolite on the axis of said surface of revolution, a plurality of rigid links pivotally joined end to end and forming a chain, a roller of predetermined diameter journaled at each joint of said chain and on one end thereof, and positioning means near the said central axis engaging the other end of said chain and positioning said chain radially about said theodolite in spoke-like fashion in any of a plurality of selected positions.

References Cited in the file of this patent
UNITED STATES PATENTS

| | | |
|---|---|---|
| 971,752 | Hull | Oct. 4, 1910 |
| 1,089,969 | Schmid | Mar. 10, 1914 |
| 1,253,877 | Payne | Jan. 15, 1918 |
| 2,245,901 | Chaskin | June 17, 1941 |
| 2,490,889 | Stallard | Dec. 13, 1949 |